March 1, 1949.　　　　C. W. LEGUILLON　　　　2,463,288
ELECTROSTATIC HEATING METHOD AND APPARATUS FOR
VULCANIZING RUBBER AND SIMILAR MATERIAL
Filed March 26, 1945　　　　　　　　　　　　2 Sheets-Sheet 1
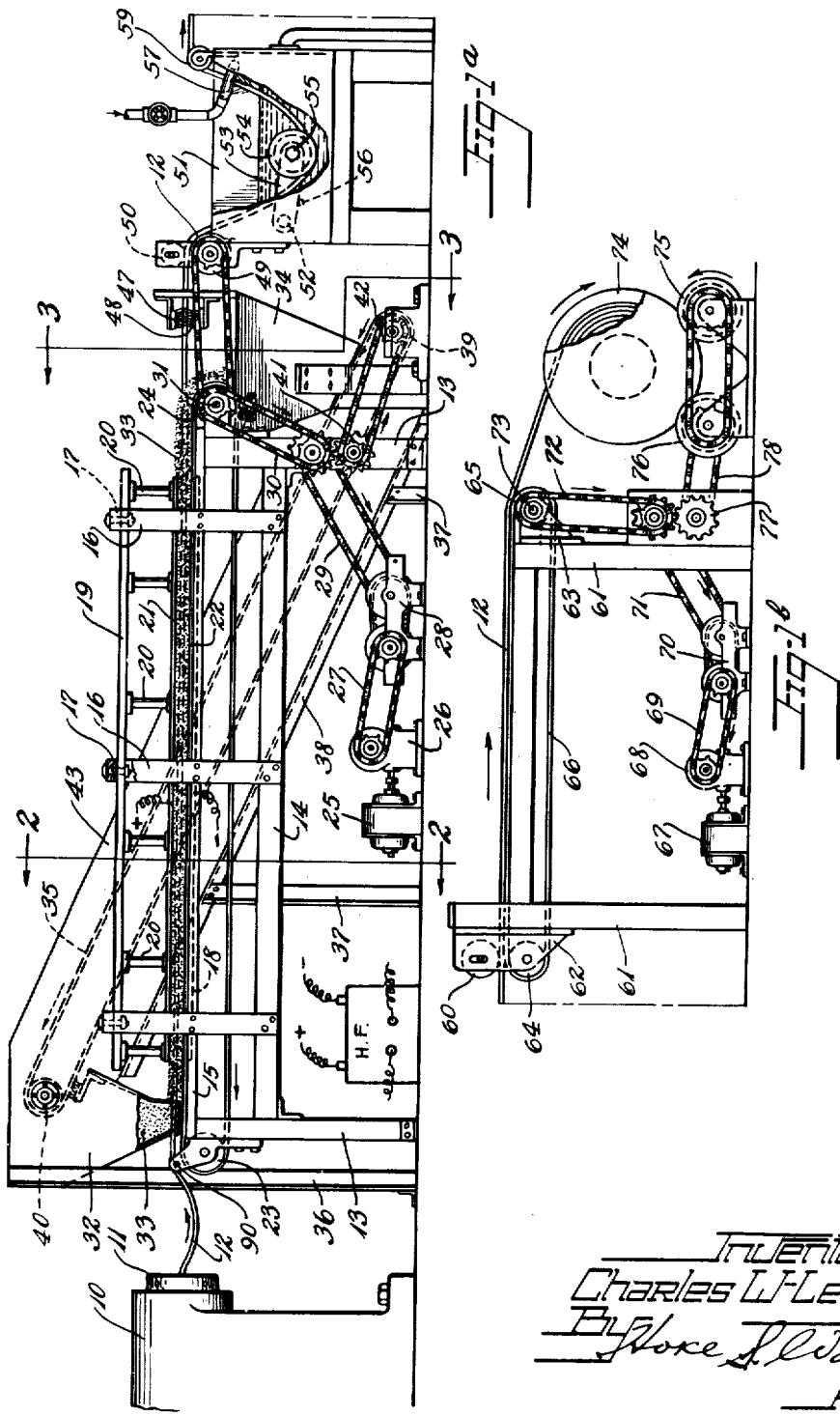

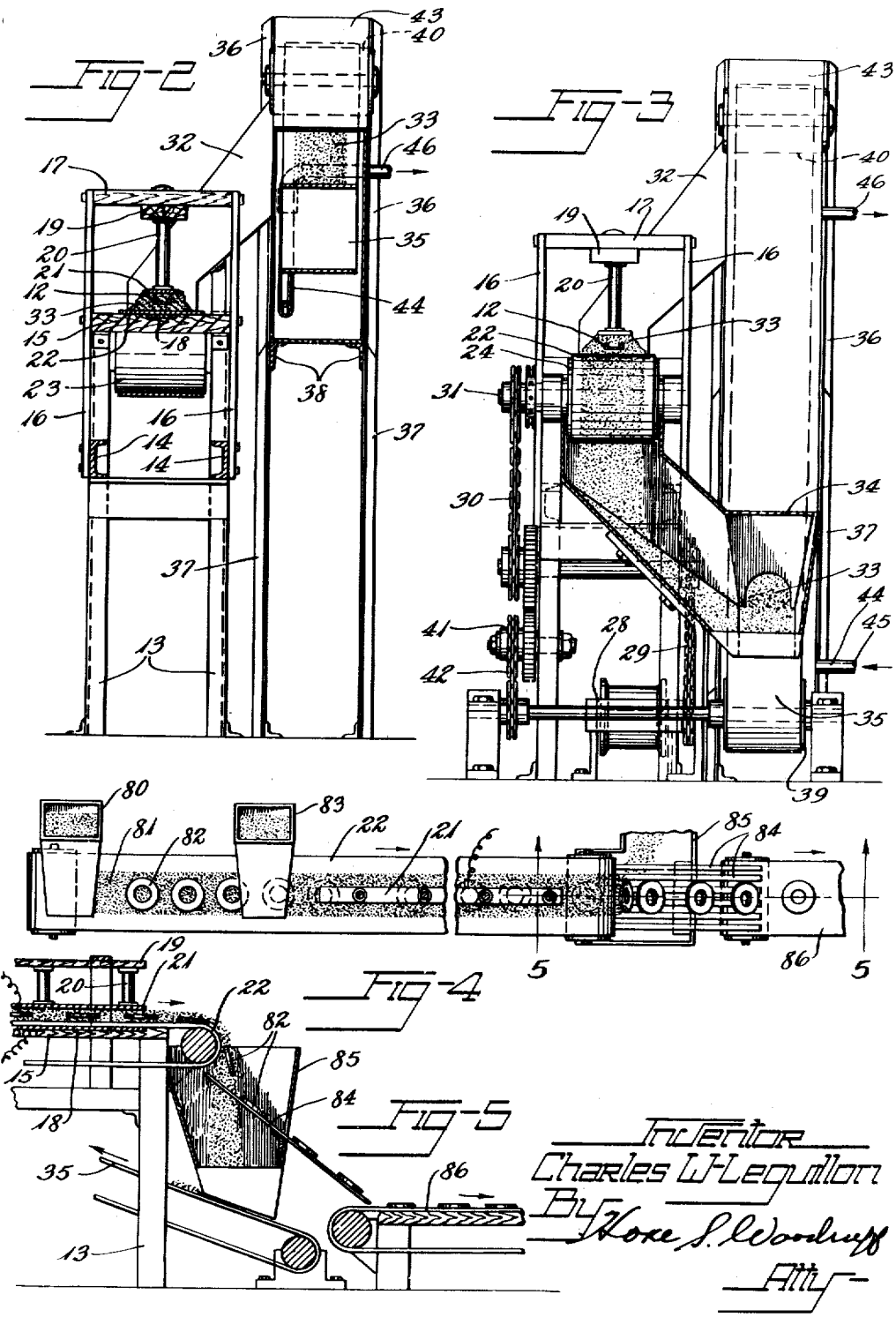

Patented Mar. 1, 1949

2,463,288

UNITED STATES PATENT OFFICE 2,463,288

ELECTROSTATIC HEATING METHOD AND APPARATUS FOR VULCANIZING RUBBER AND SIMILAR MATERIAL

Charles W. Leguillon, Akron, Ohio, assignor to The B. F. Goodrich Company, New York, N. Y., a corporation of New York Application March 26, 1945, Serial No. 584,750

21 Claims. (Cl. 18—6)

This invention relates to the production of vulcanized rubber goods and the like and is particularly concerned with methods and apparatus for the electrostatic heating and vulcanizing of rubber and similar materials in a variety of shapes and configurations without the necessity of subjecting the rubber to confining pressure during the vulcanization.

It has been proposed to vulcanize rubber products by subjecting the products to the heating effect of a high frequency alternating electrostatic field but this method has not found wide application in the commercial production of shaped bodies of vulcanized rubber for the reason that it has heretofore been considered essential that the rubber be confined in a mold under pressure or otherwise subjected to relatively high pressures during the vulcanization, as in an autoclave. Such confining pressure has been considered necessary to avoid "blowing" of the rubber with resultant production of undesirable porosity in the finished products as well as to avoid surface blisters and similar defects. Furthermore, mold confinement has been thought necessary to obtain properly shaped vulcanized articles.

Since metal must be excluded from the electrostatic field, it has been necessary to resort to molds made of insulating materials such as glass and porcelain, but these are not durable and frequently do not have sufficient strength to withstand the pressures considered necessary for effective molding. The presses or other means for furnishing molding pressure necessarily involve large masses of metal which need be carefully insulated from electrodes associated with the molds and which, in any event, are undesirable in close proximity to the electrostatic field because of their tendency to distract and distort the field and become heated themselves with resulting great loss in energy as well as other obvious complications.

Furthermore, no entirely satisfactory method has heretofore been proposed for continuously vulcanizing rubber in strip or series form by the electrostatic heating method.

The present invention aims to provide simple, economical and efficient methods and apparatus for heating and vulcanizing rubber and similar dielectric plastic materials by the electrostatic heating method while avoiding the difficulties and shortcomings hereinabove outlined.

I have found that shaped bodies of rubber and similar dielectric plastic materials may be heated and vulcanized in an electrostatic field without being confined in molds or otherwise subjected to pressure and without developing porosity, surface blisters or other defects, if the rubber is covered with freely flowable dielectric material such as finely-divided soapstone during the heating and vulcanizing operation. Continuous heating and vulcanizing of continuously produced strips or series of rubber bodies may be readily effected by transporting the rubber through the electrostatic field and flowing finely-divided dielectric material about the rubber as it enters the field. In this manner a U-shaped channel strip of rubber, for example, may be continuously and progressively vulcanized while completely unconfined except by the covering of finely-divided soapstone.

In the molding of relatively thick bodies of vulcanizable materials by conventional methods it is frequently desirable that the rubber or other vulcanizable material be uniformly preheated to vulcanization temperatures before being enclosed in the mold. Raw pieces of the vulcanizable material, of a correct predetermined weight, may be embedded in finely-divided soapstone or similar material and exposed to an electrostatic field in the manner of this invention until vulcanization temperatures are reached. This step has cut the molding cycle of heavy presses down to a fraction of what it had been formerly.

The physical characteristics of the finely-divided dielectric material utilized in the invention desirably should be such that the material will flow freely about the contours of the rubber body, while the dielectric heating properties of the material desirably should be closely similar to those of the rubber or other material to be heated and vulcanized. Powdered soapstone of the type commonly used for dusting products in the rubber industry will be found quite satisfactory. Upon exposure to the electrostatic field, the particles of powdered soapstone appear to acquire a static charge and become more fluid and readily flowable than is normally the case. Also, the soapstone itself will be heated along with the rubber by its subjection to the electrostatic field and thereby aid in securing uniform vulcanization of the rubber by preventing heat loss from the surface of the rubber. After being used once, the soapstone in its heated condition may be promptly re-used with succeeding bodies of rubber so as to aid in quickly bringing the rubber up to vulcanizing temperature.

In conventional methods of vulcanizing rubber in steam-heated molds and presses, the outside or mold contacting surfaces of the rubber reach vulcanizing temperatures earlier than the interior portions so that the surface becomes relatively case hardened with the result that gases generated in the rubber during vulcanization cannot readily escape through the case hardened skin and so are trapped and retained in the rubber with resultant production of pores, blow holes and blisters. In the present invention the interior portion of the rubber reaches vulcanizing temperatures as soon as its surface portions and, since the body is not confined, any gases which may be generated in the rubber may escape freely by distillation through the yet unvulcanized surface.

Although its effects are not fully understood, the powdered soapstone or other finely-divided solid dielectric material is believed to perform several different functions in the invention. It provides physical support for the unvulcanized rubber during the early stages of vulcanization and at the same time appears to act as a screen or spreading means to distribute the heating effect of the electrostatic field evenly over the irregular contours frequently encountered in shaped rubber articles. Inasmuch as the dielectric heating characteristics of the rubber and soapstone are closely similar, the rubber need not be accurately positioned with respect to the electrodes but may assume various positions within the mass of soapstone without producing uneven heating which otherwise might result. Also, the soapstone and rubber, though dielectric in nature, actually do conduct some current at high frequencies and the soapstone again serves to even out this current flow and prevents its being concentrated with resulting localized overheating or burning of the rubber. Further, the covering of finely-divided material prevents air oxidation of the rubber while it is at elevated temperature since it effectively excludes the atmosphere from contact with the rubber being vulcanized. Another function of the powdered dielectric material is to assist in saving power by conserving heat imparted to rubber during an extrusion or calendering operation so that the heat may be utilized for vulcanization. Heretofore the common manufacturing methods have cooled the extruded stock before it is placed in the vulcanization apparatus. In this invention an extruded product is covered immediately with the hot powdered dielectric material while the stock itself is still hot from the extruder or calender so that the heat in the stock is retained and effectively utilized during vulcanization.

The invention is readily adaptable to continuous production methods and to the progressive vulcanizing of a variety of different tapes and contours such as those found in extruded tubing, channel stripping, beading, calendered sheeting, stripping and the like. Also, the method and apparatus are readily adaptable to the progressive vulcanization of a series of individually prepared articles such as molded preforms, cuttings, stampings, and the like.

The invention will now be described in greater detail with reference to certain preferred embodiments and adaptations illustrated in the accompanying drawings, of which:

Figs. 1a and 1b constitute an elevational view showing typical apparatus of this invention as adapted to vulcanize continuously extruded rubber tubes, channels and the like, or calendered sheeting material.

Fig. 2 is a vertical section taken on the line 2—2 of Fig. 1a.

Fig. 3 is a vertical section taken on the line 3—3 of Fig. 1a.

Fig. 4 is a plan view of apparatus embodying this invention as adapted to the vulcanization of small rubber washers or gaskets and other separately pre-formed articles of vulcanizable materials.

Fig. 5 is a vertical section taken on line 5—5 of Fig. 4.

Figs. 1a, 1b, 2 and 3 of the drawings illustrate an embodiment of this invention adapted for the continuous vulcanization of an extruded or calendered rubber stock. The extruded or calendered stock may have any cross-section including solid round, square or polygonal sections, hollow tubing, channel stripping, flat calendered sheeting or stripping and the like. The illustrated apparatus comprises a number of separate functional parts including, in general: a stock supply means such as an extruder, calender, or a material take-off rack, an electrostatic vulcanizer, a product cleaning train, and a product wind-up means. The channel tubing or other rubber stock is advanced from the extruder and is supported above an endless conveyor belt of the vulcanizer and is then covered and surrounded with a powdered or finely granular dielectric material having the characteristic of being freely flowable and having the ability to be similarly heated by the heating effects of the electrostatic field. The belt, bearing the covered and surrounded stock, is advanced between two parallel electrodes of the vulcanizer across which an alternating high frequency voltage has been impressed. After passage between the electrodes the stock is cleaned by passing through the product cleaning train and wound up on a cradle roll windup mechanism.

The particular stock supply means illustrated is a conventional extrusion machine 10 having a die 11 to form a vulcanizable material into a continuous extruded stock 12 such as the deep rectangular channel strip illustrated. For example, a rubber stock of the following composition may be extruded and vulcanized by the method of this invention:

| Material | Parts by Weight |
|---|---|
| Butadiene-styrene copolymer (GR-S) [Butadiene—75%; Styrene—25%] | 100.0 |
| Carbon Black | 70.0 |
| Sulphur | 3.0 |
| Zinc oxide | 5.0 |
| Di-ortho Tolyl Guanidine | 0.25 |
| Mercaptobenzothiazole | 1.50 |
| Thin White Mineral Oil | 23.00 |
| Wax (Syncera) | 2.00 |

The vulcanizer consists of a structural steel framework for supporting an electrode arrangement, and an endless conveyor belt for transporting the stock between the electrodes. The framework comprises four corner uprights 13, 13 preferably of angle iron braced by four bottom cross members 14, 14. A wooden top 15 is supported between the four corner uprights. Six wooden upright braces 16, 16 extending from cross members 14 support an upper cross member 17 so as to form an enclosing guard. Other dielectric materials may be used instead of wood.

The wooden top 15 has a brass plate electrode 18 embedded therein and extending substantially the full length thereof. A wooden cross beam 19 running the full length of the belt supports six long porcelain insulators 20, 20 which provide insulating suspension for a second plate electrode 21 disposed a few inches above the lower electrode 18 and parallel thereto. For establishing a high frequency alternating electrostatic field between the electrodes, a suitable generator of high frequency oscillating current is provided as indicated conventionally by the legend H. F., the output leads of the generator being connected respectively to the two electrodes.

Mounted on the framework described above is an endless conveyor belt 22 of rubber, fabric, rubberized fabric or other dielectric material, which travels over pulleys 23, 24 so as to include the wooden top 15 of the apparatus within the loop of the belt and with one reach of the belt travelling below the table top and the other travelling over said top and between the electrodes 18, 21 adjacent the lower electrode 18. Variation in the time of vulcanization may be effected by varying the speed of the belt 22. A motor 25, directly connected to a gear reduction box 26, is connected by a sprocket chain 27 to a variable speed drive 28. In the particular apparatus herein described it is possible to obtain a variation of belt speed from 2 to 20 feet per minute by varying the adjustment of the variable-speed drive. With a belt having a loop 22 feet in length, the belt speeds given above correspond to a vulcanization time of about 1 to 3 minutes. By lengthening the loop of the belt it would be possible to obtain even higher belt speeds and thereby to effect a higher production rate. The variable-speed drive acts through sprocket chains 29, 30 to drive shaft 31 on which pulley 24 is keyed.

A delivery hopper 32 feeds powdered soapstone or other finely-divided dielectric material 33 into a neat trapezoidally shaped pile on the conveyor belt 22 so as to surround the rubber stock and completely fill in the remaining space between the electrodes, the stock preferably being supported a short distance above the belt as by the roller 90 (Fig. 1) so that it becomes completely surrounded by the soapstone as shown more clearly in the cross-sectional views of Figs. 2 and 3. It is possible however to place the stock directly on the belt and flow the soapstone over it. After passage between the electrodes, the powdered material drops into a collecting hopper 34 and is returned to delivery hopper 32 by means of a conveyor belt 35 or other suitable means such as a screw conveyor.

Two long structural steel uprights 36, 36 located on the rear side of the vulcanizer and four shorter uprights 37, 37 similarly located together with two inclined braces 38, 38 form a supporting framework for the powder return conveyor belt 35. The powder return conveyor belt 35 travels on pulleys 39, 40 and is driven by motor 25 by means of a reversing sprocket 41 which in turn is driven by sprocket chain 29. Sprocket chain 42 connects reversing sprocket 41 with pulley 39 over which the conveyor belt 35 travels.

The powdered material may be maintained substantially at the elevated temperature at which it issues from the electrodes by enclosing the entire return conveyor system in an insulated housing 43 or in addition supplying heat thereto by means of a heating coil 44, the heating medium entering at 45 and leaving at 46.

The vulcanized rubber product is cleaned by passing through brushes 47, 48 which knock loosely adhering powder off into the collecting hopper 34. The stock then passes over a guiding pulley 49 and under weighted roll 50, into a water tank 51 for washing by immersion. A tightening and guiding device swingably mounted on a pin 52 below the surface of water consists of a rocker arm 53 and a guide pulley 54 freely rotating on a pin 55 carried by the rocker arm. The weight of the pulley and rocker arm serves to keep the stock below the surface of the water and to prevent snarling of the stock. Pin 56 serves as a rest for the rocker arm. The stock is rinsed free of the last traces of loose powder by water sprays 57, 58 as it emerges from the water bath.

The stock then is conducted over idler pulley 59 and under weighted roll 60 to a drying table. The drying table consists of a structural steel framework comprising uprights 61, 61 which are braced by two sets of brackets 62, 63 (only one of each is visible) to form a rigid framework, the brackets also serving to support pulleys 64, 65 and the weighted roll 60.

Mounted on the framework just described and travelling on the pulleys 64, 65 is an endless dryer belt 66. The stock 12 issues from the water sprays 57, 58 at a temperature which will soon drive off the drops of water adhering thereto so that the dryer belt 66 need not have any heating provisions though the latter are not prohibited. The dryer belt need only be long enough to permit the evaporation to take place.

The dryer belt 66 is driven by motor 67 which drives through gear reduction box 68 and sprocket chain 69 to a variable speed drive 70. Sprocket chains 71, 72 link the variable-speed drive to shaft 73 on which pulley 65 is keyed.

After drying, the stock may be wound up on a take-away drum 74 which is cradled on rollers 75, 76. The wind-up or cradle-roll mechanism is synchronized with the dryer belt since it is driven by the variable-speed drive 70 through the reversing sprocket 77 and the chain 78.

Figs. 4 and 5 of the drawings illustrate a modified apparatus embodying this invention adapted to continuously vulcanize pre-formed articles such as rubber gaskets, washers, stampings and the like. In this form of the apparatus, the hopper 80 spreads a layer of powdered dielectric material 81 on the belt and the washers 82 are laid upon said layer of powder at spaced intervals. Hopper 83 then covers and surrounds the gaskets with the powdered material in such a manner to completely fill the space between the electrodes. The mechanical details of the vulcanizer are otherwise the same as above. The product separation and product removal means are different in that the screen composed of bars 84 catch the vulcanized articles while permitting the powdered material to fall through to the collecting hopper 85 as before. The vulcanized articles slide down the bars to fall on a product conveyor belt 86 which advances the product to a cleanup train much as in the first embodiment. Conveyor belt 35 again returns the powdered material to hoppers 80, 83 for re-use.

It will thus be appreciated that the extruded rubber strip or body is supported wholly by a dry fluid dielectric material in which it is free to move lengthwise in response to shrinkage or deformation recovery tendencies during vulcanization. The rubber may not improperly be said to float in the dry powder so that uneven shrinkage strains are avoided during the electrostatic heating, a further important advantage of the invention.

The powdered dielectric material which may be used to surround the stock to be heated or vulcanized may be talc, soapstone, ground wood flour, powdered mica, powdered silica gel, clays and other powdered ceramic materials such as powdered calcined clay, fine sea sand, and the like. Desirably a material should be chosen which has dielectric heating characteristics closely like those of the rubber or other material being heated so that the two materials will be heated at substantially the same rate in the electrostatic field. The ideal condition is to have the powdered dielectric material heat slightly slower than the rubber, a condition which is admirably fulfilled by the preferred powdered soapstone. The other materials mentioned as well as numerous additional ones, however, have dielectric heating properties sufficiently close to rubber to have value in the invention. As has been indicated, the physical properties of the material, and especially its particle size and particle shape characteristics, should be such as to insure free flowability about the rubber body to provide a closely packed covering.

Any appropriate generator of high frequency oscillating or alternating currents may be employed and the frequency of the current may vary widely as is well understood in the art. Generally, however, the frequency will be greater than about one million cycles per second (one megacycle) and may be as high as a hundred, two hundred or three hundred million cycles per second (100, 200 or 300 megacycles) or more. Voltages, power input, and the like also will be varied and controlled in the usual way, the details of which are well understood and form no part of the present invention.

This invention has made possible a continuous method of vulcanization which has realized great savings in time, labor and materials. Channel strips may be continuously produced and vulcanized without the necessity of supporting the channels in mold boards or using autoclaves during cure. For instance, in the making of gaskets, washers, diaphragms and the like where it has been the custom to calender a sheet of rubber material, vulcanize it and then cut the gaskets therefrom it is now possible to cut the gaskets, diaphragms and the like from the unvulcanized sheet and vulcanize the individual stampings by the apparatus of this invention. The remainder of the sheet from which the articles were cut may be returned to the calendar and resheeted for cutting more articles therefrom. A savings of 33⅓ percent or more of the materials can be achieved in this fashion.

The age resistance of vulcanizable material cured by the method of this invention is improved by the correction of two common faults of other methods of vulcanization. The overcure of surface layers usually encountered in steam-curing is eliminated by the "inside-out" heating of the high frequency field. The surface oxidation suffered by vulcanizable material when cured in air is eliminated since the powdered dielectric material used in this invention effectively excludes the atmosphere from contact with the vulcanizable material while it is at elevated temperatures. Also, the strength characteristics and surface appearance of the rubber appear to be favorably affected.

It will be understood that the principles herein disclosed are applicable generally to the heat treatment and vulcanization of all types of rubber and other similar dielectric plastic compositions having sufficient coherence prior to setting to be handled, including both natural rubbers and synthetic rubbers of various types as illustrated by the sulfur-vulcanizable synthetics of the butadiene-styrene copolymer type and the butadiene-acrylonitrile copolymer type as well as rubbers which are vulcanized by agents other than sulfur as illustrated by the vulcanization of neoprene with metal oxides. It is consequently not the intention to limit the invention to the treatment of any specific type of vulcanizable or thermosetting material unless otherwise indicated by the claims.

While the invention has been described with particular reference to certain preferred embodiments thereof it is possible to make variations and modifications therein without departing from the spirit and scope of the invention as defined in the appended claims.

I claim:

1. The method which comprises causing a body of unvulcanized but vulcanizable material to advance between a pair of spaced electrodes, progressively supplying dry finely-divided solid dielectric material about said body so that it is substantially embedded in said material during its travel between the electrodes, establishing a high frequency alternating electrostatic field between said electrodes, the said field having such characteristics as to effect substantial vulcanization of the said body in the course of its travel between the electrodes, progressively removing said embedded body from between said electrodes, and separating said body from said dielectric material.

2. The method which comprises advancing a body of unvulcanized but vulcanizable material between a pair of opposed plane parallel electrodes forming part of an oscillatory circuit so that a high frequency alternating electrostatic field of substantially uniform intensity is established between the electrodes, progressively supplying dry finely-divided solid dielectric material to substantially embed said body as it enters said field, separating said finely-divided dielectric material from said body after it has traversed the field with said body, and returning said finely-divided dielectric material to the point of application to the body for reuse.

3. The method which comprises advancing a body of unvulcanized but vulcanizable material between a pair of spaced electrodes forming part of an oscillatory circuit so that a high frequency alternating electrostatic field is established between the electrodes, progressively supplying dry finely-divided solid dielectric material to substantially embed said body as it enters said field, separating said finely-divided dielectric material from said body after it has traversed the field with said body, progressively transporting the collected material back to the point of application to the body for reuse, and supplying heat to said material during the last said transportation by means other than high frequency electrostatic heating means.

4. The method which comprises progressively forming in a continuous manner an elongated body of unvulcanized but vulcanizable material, advancing said body in a progressive manner, covering the body as it advances by pouring finely-divided dry solid dielectric material about said body, and establishing a high frequency alternating electrostatic field in a zone traversed by the covered body during its progressive advance, the said field having such characteristics as to effect substantial vulcanization of the body.

5. The method which comprises progressively forming in a continuous manner a strip of unvulcanized but vulcanizable material, advancing said strip in a progressive manner, covering the strip as it advances by pouring finely-divided dry solid dielectric material about said strip, establishing a high frequency alternating electrostatic field in a zone traversed by the covered strip during its progressive advance, collecting the said finely-divided dielectric material after it has traversed said zone and returning said material for re-use in covering strip material entering said zone, heat being supplied to said finely-divided dielectric material before it is re-used.

6. The method which comprises causing a conveyor belt or the like to travel in a generally horizontal plane between a pair of vertically opposed plane parallel electrodes forming part of an oscillatory circuit so as to establish a high frequency alternating electrostatic field of substantially uniform intensity between said electrodes, the said belt travelling adjacent the lower electrode, progressively feeding a strip of vulcanizable material in spaced relation above said conveyor belt and between said electrodes, progressively flowing finely-divided dry solid dielectric material onto the belt about said strip so as substantially to surround the strip with a leveled layer of said dielectric material and fill the remaining space between the electrodes in the zone occupied by the strip, said dielectric material having substantially the same dielectric heating characteristics as said strip of vulcanizable material progressively transporting the strip and surrounding dielectric material through said field at atmospheric pressure to substantially vulcanize the strip material removing said strip with said dielectric material from said field, and separating said strip from said dielectric material.

7. Apparatus comprising means for establishing a high frequency alternating electrostatic field of substantially uniform intensity, conveyor means for transporting a body of dielectric material through the field, extrusion means for disposing said body on said conveyor means in advance of its passage through said field, means for progressively flowing finely-divided solid dielectric material in a free-flowing, dry condition about said body while it is being advanced by the said conveyor means, and separator means for separating said body from said dielectric material after its passage through said field.

8. Apparatus comprising means for establishing a high frequency alternating electrostatic field of substantially uniform intensity, conveyor means for transporting a body of dielectric material through said field, extrusion means for continuously depositing said body upon said conveyor in advance of its passage through said field, means for depositing finely-divided solid dielectric material in a free-flowing, dry condition about said body on said conveyor means, means for separating the finely-divided material from said body after it has traversed the field, and means for returning said finely-divided material to the aforesaid depositing means for re-use.

9. Apparatus comprising means for establishing a high frequency alternating electrostatic field of substantially uniform intensity, conveyor means for transporting a body of dielectric material through said field, means for depositing finely-divided solid dielectric material in a free-flowing, dry condition about said body on said conveyor means, means for separating the finely-divided material from said body after it has traversed the field, means for returning said finely-divided material to the aforesaid depositing means for re-use, and means for maintaining the finely-divided material at an elevated temperature until it is re-used.

10. Apparatus comprising a pair of vertically opposed plane parallel electrodes of elongated form, means for establishing a high frequency alternating electrostatic field between said electrodes, a conveyor belt travelling through said field in alignment with the electrodes and adjacent the lower electrode means for forming a continuous length of plastic dielectric material and depositing it on said conveyor belt, means for progressively flowing finely-divided solid dielectric material in a free-flowing, dry condition onto said belt in such manner as to cover a body carried on the belt with a leveled layer of said dielectric material and substantially to fill the remaining space between the electrodes in the zone occupied by said body, and means for separating said dielectric material from said body.

11. Apparatus comprising means for establishing a high-frequency alternating electrostatic field of substantially uniform intensity and of elongated configuration, a conveyor belt for transporting dielectric material longitudinally through said field to be heated thereby, means for progressively supplying a continuous strip of dielectric material in spaced relation above the belt in advance of its passage through said field for travel in timed relation with the belt, and means adjacent the last said means for flowing finely-divided solid dielectric material in a dry condition onto said belt and about said strip in such manner as substantially to embed said strip in a leveled layer of said finely-divided dielectric material.

12. The method which comprises causing a pre-formed continuous elongated body of vulcanizable material to travel in parallel spaced relation above a support travelling in timed relation therewith, progressively flowing dry, finely-divided, dielectric material onto said support and about said body so as substantially to embed said body in a leveled layer of said material while the support and body are travelling, establishing a high-frequency alternating electrostatic field of substantially uniform intensity in a zone traversed by the embedded body, said field being adapted substantially to vulcanize the body, and thereafter separating the vulcanized body from the finely-divided dielectric material.

13. The method which comprises pre-forming a body of vulcanizable material, substantially embedding said pre-formed body in a leveled layer of a dry, finely-divided dielectric material, transporting the body while so embedded through a high-frequency alternating electrostatic field between a pair of vertically spaced plane parallel electrodes until the said body is vulcanized, and thereafter separating the vulcanized body from the finely-divided dielectric material.

14. The method which comprises progressively producing a continuous elongated body of vulcanizable material at a temperature substantially above room temperature, advancing said body in a progressive fashion in timed relation with a travelling support, progressively depositing dry, finely-divided dielectric material in a leveled layer about said body on said support as it advances and before said body has cooled substantially, immediately advancing the body and deposited finely-divided dielectric material through a high-frequency alternating electrostatic field between a pair of opposed plane parallel electrodes until said body is vulcanized, and thereafter separating the body from the finely-divided dielectric material.

15. The method of vulcanizing a body of vulcanizable material of non-rectangular cross-section to produce a non-porous product which comprises establishing a high frequency alternating electrostatic field of substantially uniform intensity, introducing said body into said field while completely covered with a freely flowable finely-divided solid dielectric material, maintaining said covered body in said field unconfined except by said dielectric material to heat and vulcanize said body, removing said body from said electrostatic field, and separating said body from said dielectric material.

16. The method of vulcanizing uniformly a body of vulcanizable material of non-rectangular cross-section which comprises establishing a high frequency electrostatic field of substantially uniform intensity, embedding said body in a mass of freely flowable finely-divided solid dielectric material, introducing said body embedded in said mass into said electrostatic field and maintaining said body therein at atmospheric pressure to heat and vulcanize said body, said body being unconfined except by said dielectric material, removing said embedded body from said electrostatic field, and separating said body from said dielectric material.

17. Apparatus for continuous vulcanization of vulcanizable material which comprises a pair of opposed parallel plane electrodes, means for establishing a high frequency alternating electrostatic field between said electrodes, conveyor means for transporting a body of said vulcanizable material between said electrodes, means for supplying said body of vulcanizable material in a continuous length to said conveyor means, means for disposing around said body prior to its passage between said electrodes a mass of freely flowable finely-divided solid dielectric material having opposed surfaces parallel to the opposed surfaces of said electrodes, and separator means for separating said body from said mass after passage between said electrodes.

18. Apparatus for vulcanization of a body of vulcanizable material comprising means for establishing a high frequency alternating electrostatic field of substantially uniform intensity, means for progressively advancing said body of vulcanizable material through said field, means for depositing finely-divided solid dielectric material in a free-flowing, dry condition about said body in advance of its passage through said field, and means for separating said finely-divided material from said body after it has traversed said field.

19. The method which comprises causing a body of unvulcanized but vulcanizable material to advance between a pair of spaced electrodes, progressively supplying about said body dry finely-divided solid dielectric material having substantially the same dielectric heating properties as said body so that it is substantially embedded in said material during its travel between the electrodes, establishing a high frequency alternating electrostatic field between said electrodes to effect substantial vulcanization of said body in the course of its travel between said electrodes, progressively removing said embedded body from between said electrodes, and separating said body from said dielectric material.

20. The method which comprises progressively forming in a continuous manner an elongated body of unvulcanized but vulcanizable material, advancing said body in a progressive manner, covering said body as it advances by pouring about it finely-divided dry solid dielectric material having substantially the same dielectric heating properties as said body, and establishing a high frequency alternating electrostatic field in a zone traversed by the covered body during its progressive advance to effect substantial vulcanization of the body.

21. The method which comprises progressively producing a continuous elongated body of vulcanizable material at a temperature substantially above room temperature, advancing said body in progressive fashion in timed relation with a traveling support, progressively depositing dry finely-divided dielectric material having substantially the same dielectric heating properties as said body in a leveled layer about said body on said support as it advances and before said strip has cooled substantially, immediately advancing the body and deposited finely-divided dielectric material through a high frequency alternating electrostatic field between a pair of opposed parallel electrodes until said body is vulcanized, and thereafter separating the body from the finely-divided dielectric material.

CHARLES W. LEGUILLON.

REFERENCES CITED

The following references are of record in the file of this patent:

UNITED STATES PATENTS

| Number | Name | Date |
|---|---|---|
| 9,668 | Goodyear et al. | Apr. 12, 1853 |
| 1,162,397 | Price | Nov. 30, 1915 |
| 1,482,473 | Lord et al. | Feb. 5, 1924 |
| 1,661,888 | Fisher | Mar. 6, 1928 |
| 1,711,716 | Bausman | May 7, 1929 |
| 1,884,926 | Van Ness | Oct. 25, 1932 |
| 2,049,415 | Curtis | Aug. 4, 1936 |
| 2,119,910 | Ferry | June 7, 1938 |
| 2,121,872 | Hozell et al. | June 28, 1938 |
| 2,163,784 | Gammeter | June 27, 1939 |
| 2,233,175 | Melton et al. | Feb. 25, 1941 |
| 2,280,771 | Dufour et al. | Apr. 28, 1942 |
| 2,282,317 | Bennett | May 12, 1942 |
| 2,333,143 | Bennett | Nov. 2, 1943 |
| 2,341,617 | Hull | Feb. 15, 1944 |
| 2,362,653 | McGovern | Nov. 14, 1944 |
| 2,415,028 | Bosomworth et al. | Jan. 28, 1947 |
| 2,421,097 | Lakso | May 27, 1947 |

FOREIGN PATENTS

| Number | Country | Date |
|---|---|---|
| 517,798 | Great Britain | Feb. 8, 1940 |

OTHER REFERENCES

Gottlob's Technology of Rubber, Maclaren & Sons Ltd., 1927. (Copy in Div. 15.)

Certificate of Correction

Patent No. 2,463,288.   March 1, 1949.

CHARLES W. LEGUILLON

It is hereby certified that errors appear in the printed specification of the above numbered patent requiring correction as follows:

Column 7, line 50, for "calendar" read *calender*; column 9, line 33, claim 6, after the word "material" insert a comma; column 12, line 52, list of references cited, for "Hozell et al." read *Hazell et al.*;

and that the said Letters Patent should be read with these corrections therein that the same may conform to the record of the case in the Patent Office.

Signed and sealed this 22nd day of November, A. D. 1949.

[SEAL]

THOMAS F. MURPHY,
*Assistant Commissioner of Patents.*